US012577408B2

(12) United States Patent (10) Patent No.: US 12,577,408 B2
Kondo et al. (45) Date of Patent: Mar. 17, 2026

(54) WATER-BASED COATING COMPOSITION, AND MULTI-LAYER COATING FILM

(71) Applicant: NIPPON PAINT AUTOMOTIVE COATINGS CO., LTD., Osaka (JP)

(72) Inventors: Masaaki Kondo, Hirakata (JP); Mari Miki, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 51 days.

(21) Appl. No.: 17/899,904

(22) Filed: Aug. 31, 2022

(65) Prior Publication Data

US 2022/0411643 A1 Dec. 29, 2022

Related U.S. Application Data

(62) Division of application No. 16/486,972, filed as application No. PCT/JP2018/005673 on Feb. 19, 2018, now Pat. No. 11,518,890.

(30) Foreign Application Priority Data

Feb. 21, 2017 (JP) ................................. 2017-030335

(51) Int. Cl.
*C09D 5/02* (2006.01)
*B05D 5/06* (2006.01)
(Continued)

(52) U.S. Cl.
CPC ............. *C09D 5/028* (2013.01); *B05D 5/066* (2013.01); *C08K 5/34922* (2013.01);
(Continued)

(58) Field of Classification Search
CPC ........ C08L 33/04; C08L 33/066; C08L 67/00; C08L 61/28; C08L 2205/03; C09D 5/028;
(Continued)

(56) References Cited

U.S. PATENT DOCUMENTS

2004/0251329 A1* 12/2004 Hsu ...................... C09D 17/001
241/15
2006/0141162 A1 6/2006 Egusa et al.
(Continued)

FOREIGN PATENT DOCUMENTS

CN 102395630 3/2012
JP 11033377 A * 2/1999
(Continued)

OTHER PUBLICATIONS

JP-11033377-A, Feb. 9, 1999, machine translation (Year: 1999).*
(Continued)

*Primary Examiner* — Satya B Sastri
(74) *Attorney, Agent, or Firm* — WENDEROTH, LIND & PONACK, L.L.P.

(57) ABSTRACT

A challenge of the present invention is to provide a water-based coating composition capable of providing a design superior in depth feeling in the formation of a multilayer coating film having a so-called color clear coating film. The present invention relates to a water-based coating composition comprising a coating film-forming resin (i) and a coloring pigment dispersion (ii), wherein the coating film-forming resin (i) comprises: an acrylic resin emulsion (A) having an average particle diameter of 100 nm or less in an amount of 10 to 60% by mass in terms of the resin solid content of the coating film-forming resin (i), a water-soluble acrylic resin (B) in an amount of 5 to 40% by mass in terms of the resin solid content of the coating film-forming resin (i), and a melamine resin (C) in an amount of 20 to 40% by mass in terms of the resin solid content of the coating film-forming resin (i); and the coloring pigment dispersion (ii) comprises a coloring pigment (D) having a 90%-volume particle diameter (D90) of 100 nm or less.

3 Claims, 1 Drawing Sheet

(51) Int. Cl.

| | |
|---|---|
| *C08K 5/3492* | (2006.01) |
| *C08L 47/00* | (2006.01) |
| *C08L 51/00* | (2006.01) |
| *C09D 5/44* | (2006.01) |
| *C09D 17/00* | (2006.01) |

(52) U.S. Cl.

CPC .............. *C08L 47/00* (2013.01); *C08L 51/00* (2013.01); *C09D 5/027* (2013.01); *C09D 5/4411* (2013.01); *C09D 5/4423* (2013.01); *C09D 17/003* (2013.01); *C09D 17/008* (2013.01); *B05D 2451/00* (2013.01); *C08K 2201/003* (2013.01); *C08L 2205/03* (2013.01)

(58) Field of Classification Search

CPC ........................... C09D 5/4411; C09D 133/00; C09D 133/066; C09D 161/28; C09D 17/41; C09D 17/008; C09D 7/41; C08K 5/34922

See application file for complete search history.

(56) References Cited

U.S. PATENT DOCUMENTS

| | | | |
|---|---|---|---|
| 2007/0237903 A1 | 10/2007 | Hiwara et al. | |
| 2008/0264300 A1 | 10/2008 | Sato et al. | |
| 2008/0268269 A1* | 10/2008 | Kobata | C09D 17/002 |
| | | | 526/278 |
| 2009/0041942 A1 | 2/2009 | Hayashi et al. | |
| 2009/0280256 A1* | 11/2009 | Narita | C09D 143/02 |
| | | | 427/372.2 |
| 2009/0305050 A1 | 12/2009 | Nakane et al. | |
| 2010/0201769 A1 | 8/2010 | Kakikawa | |
| 2013/0089731 A1 | 4/2013 | Imanaka et al. | |
| 2014/0335348 A1 | 11/2014 | Kitamura | |
| 2015/0217332 A1 | 8/2015 | Fujii et al. | |
| 2015/0307734 A1 | 10/2015 | Nonogaki et al. | |
| 2016/0354805 A1 | 12/2016 | Fujiwara | |
| 2017/0001217 A1 | 1/2017 | Fujiwara | |

FOREIGN PATENT DOCUMENTS

| | | | |
|---|---|---|---|
| JP | 11-236521 A | * | 8/1999 |
| JP | 2001-38286 | | 2/2001 |
| JP | 2001-314807 | | 11/2001 |
| JP | 2005-75919 | | 3/2005 |
| JP | 2006-182966 | | 7/2006 |
| JP | 2007-56161 | | 3/2007 |
| JP | 2008222981 A | * | 9/2008 |
| JP | 2008-280518 | | 11/2008 |
| JP | 2009-91589 | | 4/2009 |
| JP | 2011-26543 | | 2/2011 |
| JP | 2011-131135 | | 7/2011 |
| JP | 2012-61451 | | 3/2012 |
| JP | 2013-169507 | | 9/2013 |
| JP | 2013-535311 | | 9/2013 |
| JP | 2014-42891 | | 3/2014 |
| JP | 2015-214672 | | 12/2015 |
| JP | 2017-14150 | | 1/2017 |
| WO | 2005/000914 | | 1/2005 |
| WO | 2006/054611 | | 5/2006 |
| WO | 2010/119969 | | 10/2010 |
| WO | 2015/099150 | | 7/2015 |
| WO | 2015/099151 | | 7/2015 |

OTHER PUBLICATIONS

JP-2008222981-A, 2008, machine translation (Year: 2008).*

JP 11-236521 A, machine translation, 1999 (Year: 1999).*

International Search Report issued Apr. 10, 2018 in International Application No. PCT/JP2018/005673.

International Preliminary Report on Patentability issued Sep. 6, 2019 in International Application No. PCT/JP2018/005673.

Extended European Search Report issued Nov. 20, 2020 in European Patent Application No. 18756728.4.

Notice of Reasons for Refusal issued Feb. 2, 2021 in corresponding Japanese Patent Application No. 2017-030335, with Machine translation.

Office Action issued May 9, 2023 in Japanese Patent Application No. 2022-033843, with English-language translation.

Toshihiro Ishii, "The Latest Pigment Dispersion Technology using Bead Mill", Journal of the Japan Society of Colour Material, vol. 87, Issue 6, pp. 209-215, 2014, with English Abstract.

Huang, Huining, "Application of Digital Inkjet Printing Technology and Equipment for Ceramic Wall and Floor Tiles", p. 77, China Construction Materials Industry Press, May 31, 2018, cited in item CC and relevance provided in item CC (English translation).

Feng, Liming, et al., "Tuzhuang Gongyi Yu Shebei", Chemical Industry Press, p. 11, Jul. 31, 2004, cited in item CC and relevance provided in item CC (English translation).

Decision of Rejection with Search Report issued Dec. 5, 2025, in Chinese Patent Application No. 202311719151.8, with English translation.

Office Action and Search Report issued Jan. 8, 2026 in Chinese Patent Application No. 202410475552.1, with English translation.

\* cited by examiner

WATER-BASED COATING COMPOSITION, AND MULTI-LAYER COATING FILM

TECHNICAL FIELD

The present invention relates to a water-based coating composition and a multilayer coating film obtainable by applying the water-based coating corn position.

In the field of industrial products such as automobile painting, various colors and design properties dependent on the preference of users and the like are required. One example of such a design is a multilayer coating film in which a color clear coating film containing a coloring pigment is applied on a coating film containing a luster material and/or a coloring pigment. Since in this multilayer coating film, the color and/or the reflected light of the lower coating film can be visually recognized through the color clear coating film provided as the upper layer, the multilayer coating film is a multilayer coating film being superior in feeling of color depth. For example, a coating film obtained by applying a color clear coating film containing a coloring pigment on a metallic base coating film containing a luster material is called a "candy color" coating film and is known as a multilayer coating film having high design properties with high chroma, high brightness and superior feeling of color depth.

For example, JP-A-2014-042891 (Patent Literature 1) discloses a method for forming a highly designed multilayer coating film that is a method for forming a multilayer coating film in which a metallic base coating is applied on a surface of an object to be coated to form a metallic base coating film, and subsequently, a colored base coating is applied on form a colored base coating film, and then a clear coating composition is applied on the colored base coating film to form a clear coating film, and then heat curing the resulting metallic base coating film, the colored base coating film and the clear coating film, wherein the light reflectance of the metallic base coating film is within a prescribed range, and the light transmittance of a single colored base coating film obtained by heat curing the colored base coating film as a single film is within a prescribed range. It is disclosed that by this method, a highly designed multilayer coating film being less prone to allow color unevenness to occur in the coating film, being uniform in the resulting design, being high in chroma and brightness, and having deep feeling of color can be obtained even if variation in film thickness is not strictly suppressed during application.

CITATION LIST

Patent Literature

Patent Literature 1: JP-A-2014-042891

SUMMARY OF THE INVENTION

Technical Problems

An object of the present invention is to provide a water-based coating composition capable of providing a design superior in depth feeling in the formation of a multilayer coating film having a so-called color clear coating film.

Solution to Problems

In order to solve the above-described problems, the present invention provides the following embodiments.

[1]

A water-based coating composition comprising a coating film-forming resin (i) and a coloring pigment dispersion (ii), wherein the coating film-forming resin (i) comprises:

an acrylic resin emulsion (A) having an average particle diameter of 100 nm or less in an amount of 10 to 60% by mass in terms of a resin solid content of the coating film-forming resin (i), a water-soluble acrylic resin (B) in an amount of 5 to 40% by mass in terms of the resin solid content of the coating film-forming resin (i), and a melamine resin (C) in an amount of 20 to 40% by mass in terms of the resin solid content of the coating film-forming resin (i); and the coloring pigment dispersion (ii) comprises a coloring pigment (D) having a 90%-volume particle diameter (D90) of 100 nm or less.

[2]

The above water-based coating composition, wherein an amount of the coloring pigment (D) contained in the water-based coating composition is in a range of 0.1 to 25 parts by mass based on 100 parts by mass of the resin solid content of the coating film-forming resin (i).

[3]

The above water-based coating composition, wherein the 90%-volume particle diameter (D90) of the coloring pigment (D) contained in the coloring pigment dispersion (ii) is 50 nm or less.

[4]

The above water-based coating composition, wherein the coloring pigment (D) is one or more coloring pigments selected from the group consisting of an organic color pigment and an inorganic color pigment, the organic coloring pigment is one or more selected from the group consisting of azo-chelate-based pigments, insoluble azo-based pigments, condensed azo-based pigments, diketopyrrolopyrrole-based pigments, phthalocyanine-based pigments, indigo pigments, perinone-based pigments, perylene-based pigments, dioxane-based pigments, quinacridone-based pigments, isoindolinone-based pigments, and metal complex pigments, and the inorganic coloring pigment is one or more selected from the group consisting of chrome yellow, yellow iron oxide, colcothar, carbon black, and titanium dioxide.

[5]

The above water-based coating composition, wherein the acrylic resin emulsion (A) is an emulsion polymerization product of a monomer mixture comprising one or more crosslinking monomers selected from the group consisting of allyl methacrylate, ethylene glycol dimethacrylate and divinylbenzene.

[6]

The above water-based coating composition, wherein the coloring pigment dispersion (ii) comprises a pigment dispersing agent, and an amount of the pigment dispersing agent is 65 to 150 parts by mass as solid content mass parts based on 100 parts by mass of the coloring pigment (D).

[7]

The above water-based coating composition, wherein the pigment dispersant is a comb-structured polymer pigment dispersing agent.

[8]

The above water-based coating composition, wherein the coating film-forming resin (i) further comprises a polyester resin.

[9]

The above water-based coating composition, wherein with respect to the coating film-forming resin (i) and the coloring pigment dispersion (ii) comprised in the water-based coating composition, a 25 μm-thick cured coating film of a composition for haze measurement that is a composition comprising the coating film-forming resin (i) and the coloring pigment dispersion (ii), wherein the amount of a coloring pigment (D) comprised in the composition is 4% by mass based on 100 parts by mass of the resin solid content of the coating film-forming resin (i), has a haze value of 8 or less.

[10]

A multilayer coating film comprising a first base coating film and a second base coating film, wherein the first base coating film comprises at least one pigment selected from the group consisting of a luster pigment and a coloring pigment, and the second base coating film is a cured coating film of the above water-based coating composition.

[11]

The above multilayer coating film, wherein a thickness of the first base coating film is 3 to 20 μm, and a thickness of the second base coating film is 3 to 20 μm.

[12]

A method for producing a coloring pigment dispersion (ii) to be used for preparation of the above water-based coating composition, comprising a step of mixing and dispersing a coloring pigment (D) and a pigment dispersing agent in an aqueous medium, wherein the pigment dispersing agent is a comb-structured polymer pigment dispersing agent, an amount of the pigment dispersing agent is 65 to 150 parts by mass as solid content mass parts based on 100 parts by mass of the coloring pigment (D), and a 90%-volume particle diameter (D90) of the coloring pigment (D) contained in the coloring pigment dispersion (ii) obtained is 100 nm or less.

[13]

A method for producing the above water-based coating composition, comprising a step of mixing a coating film-forming resin (i) and a coloring pigment dispersion (ii) to produce a water-based coating composition, wherein the coating film-forming resin (i) comprises an acrylic resin emulsion (A) having an average particle diameter of 100 nm or less in an amount of 10 to 60% by mass in terms of a resin solid content of the coating film-forming resin (i), a water-soluble acrylic resin (B) in an amount of 5 to 40% by mass in terms of the resin solid content of the coating film-forming resin (i), and a melamine resin (C) in an amount of 20 to 40% by mass in terms of the resin solid content of the coating film-forming resin (i), wherein the coloring pigment dispersion (ii) is a coloring pigment dispersion (ii) obtained by the method according to embodiment 12, and the coloring pigment dispersion (ii) comprises a coloring pigment (D) having a 90%-volume particle diameter (D90) of 100 nm or less.

Advantageous Effects of Invention

Coating films resulting from the application of the water-based coating composition of the present invention are characterized by being low in haze value and high in transparency despite containing a coloring pigment. Therefore, by applying the water-based coating composition of the present invention, it is possible to form a color clear coating film being high in chroma and high in brightness.

DESCRIPTION OF EMBODIMENTS

Figure 1:
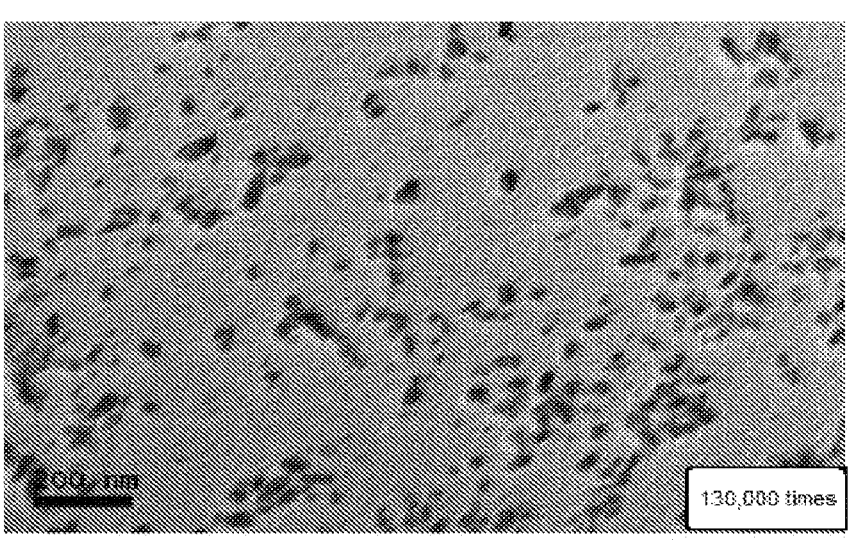
FIG. 1 is a transmission electron micrograph of the coloring pigment dispersion (ii) prepared in Example 6.

First, the process leading to the present invention will be described. The above-cited Patent Document 1 discloses a method for forming a multilayer coating film. It is described that a candy color multilayer coating film being high in chroma and brightness and having a deep color feeling can be obtained by this method of forming a multilayer coating film. The present inventors have found that the brightness of a resulting multilayer coating film can be further increased by enhancing the transparency of the color clear coating film (the second base coating film) in such a candy color multilayer coating film. One example of the method of enhancing the transparency of the color clear coating film (the second base coating film) may be a method of reducing the amount of the coloring pigment. However, when the amount of the coloring pigment is reduced to enhance the transparency of the color clear coating film, the brightness will be raised while the chroma will be reduced, so that the depth of color will be reduced.

The present inventors conducted various studies on physical properties of a color clear coating film (a second base coating film) in order to obtain a multilayer coating film being high in chroma and brightness and having a deep color feeling. During these studies, it has been found through experiments that it is possible to greatly improve the transparency of a resulting coating film without reducing the content of a coloring pigment and also possible to raise the brightness thereby while maintaining a high chroma by using a water-based coating composition comprising a coating film-forming resin (i) and a coloring pigment dispersion (ii) as the water-based coating composition to be used for the formation of the color clear coating film (the second base coating film), using a coating film-forming resin (i) comprising an acrylic resin emulsion (A), a water-soluble acrylic resin (B), and a melamine resin (C) in specified proportions as the coating film-forming resin (i) contained in the water-based coating composition, controlling the average particle diameter of the acrylic resin emulsion (A) to 100 nm or less, and controlling the 90%-volume particle diameter (D90) of the coloring pigment (D) in the coloring pigment dispersion (ii) contained in the water-based coating composition to 100 nm or less, and thus the present invention has been accomplished. Hereafter, the configuration of the present invention will be described in detail.

Water-Based Coating Composition

The water-based coating composition of the present invention comprises a coating film-forming resin (i) and a coloring pigment dispersion (ii). The coating film-forming resin (i) comprises:

an acrylic resin emulsion (A) having an average particle diameter of 100 nm or less, in an amount of 10 to 60% by mass in terms of the resin solid content of the coating film-forming resin (i), a water-soluble acrylic resin (B), in an amount of 5 to 40% by mass in terms of the resin solid content of the coating film-forming resin (i), and a melamine resin (C), in an amount of 20 to 40% by mass in terms of the resin solid content of the coating film forming resin (i). In addition, the coloring pigment dispersion (ii) comprises a coloring pigment (D) having a 90%-volume particle diameter (D90) of 100 nm or less. In the following, the respective ingredients are described in detail.

Acrylic Resin Emulsion (A)

The water-based coating composition of the present invention contains a coating film-forming resin (i). The coating film-forming resin (i) contains an acrylic resin emulsion (A). The acrylic resin emulsion (A) is obtained by emulsion-polymerizing a mixture of α,β-ethylenically unsaturated monomers (a monomer mixture). The monomer mixture may have an acid value and a hydroxyl value by containing an α,β-ethylenically unsaturated monomer having an acid group, an α,β-ethylenically unsaturated monomer having a hydroxyl group, etc. The acid value and the hydroxyl value of the acrylic resin emulsion (A) affect the solubility in water, the crosslinking performance, etc. of a resulting emulsion.

Examples of the α,β-ethylenically unsaturated monomer having an acid group include acrylic acid, methacrylic acid, acrylic acid dimer, crotonic acid, 2-acryloyloxyethylphthalic acid, 2-acryloyloxyethylsuccinic acid, ω-carboxy-poly-caprolactone mono(meth)acrylate, isocrotonic acid, α-hydro-ω-((1-oxo-2-propenyl)oxy) poly(oxy(1-oxo-1,6-hexanediyl)), maleic acid, fumaric acid, itaconic acid, 3-vinylsalicylic acid, 3-vinylacetylsalicylic acid, 2-acryloyloxyethyl acid phosphate, and 2-acrylamido-2-methylpropanesulfonic acid. As the α,β-ethylenically unsaturated monomer having an acid group, it may be more preferable to use acrylic acid, methacrylic acid, acrylic acid dimer, or the like.

Examples of the α,β-ethylenically unsaturated monomer having a hydroxyl group include hydroxyethyl (meth)acrylate, hydroxypropyl (meth)acrylate, hydroxybutyl (meth) acrylate, allyl alcohol, methacryl alcohol, and an adduct of hydroxyethyl (meth)acrylate and ε-caprolactone. As the α,β-ethylenically unsaturated monomer having a hydroxyl group, it may be more preferable to use hydroxyethyl (meth)acrylate, hydroxybutyl (meth)acrylate, an adduct of hydroxyethyl (meth)acrylate and ε-caprolactone, or the like.

The above monomer mixture may further contain other α,β-ethylenically unsaturated monomers. Examples of such other α,β-ethylenically unsaturated monomers include (meth)acrylic acid esters (e.g., methyl (meth)acrylate, ethyl (meth)acrylate, n-propyl (meth)acrylate, n-butyl (meth) acrylate, isobutyl (meth)acrylate, t-butyl (meth)acrylate, 2-ethylhexyl (meth)acrylate, lauryl methacrylate, phenyl acrylate, isobornyl (meth)acrylate, cyclohexyl methacrylate, t-butylcyclohexyl (meth)acrylate, dicyclopentadienyl (meth)acrylate, and dihydrodicyclopentadienyl (meth)acrylate), polymerizable amide compounds (e.g., (meth)acrylamide, N-methylol(meth)acrylamide, N-butoxymethyl (meth)acrylamide, N,N-dimethyl(meth)acrylamide, N,N-dibutyl(meth)acrylamide, N,N-dioctyl(meth)acrylamide, N-monobutyl(meth)acrylamide, N-monooctyl(meth)acrylamide 2,4-dihydroxy-4'-vinylbenzophenone, N-(2-hydroxyethyl)acrylamide, and N-(2-hydroxyethyl)methacrylamide), polymerizable aromatic compounds (e.g., styrene, α-methylstyrene, vinyl ketone, t-butylstyrene, parachlorostyrene, and vinylnaphthalene), polymerizable nitriles (e.g., acrylonitrile and methacrylonitrile), α-olefins (e.g., ethylene and propylene), vinyl esters (e.g., vinyl acetate and vinyl propionate), dienes (e.g., butadiene and isoprene), polymerizable aromatics compounds, polymerizable nitriles, α-olefins, vinyl esters, and dienes. These α,β-ethylenically unsaturated monomers may be appropriately selected according to the desired performance or the like of a coating film.

The monomer mixture to be used for the preparation of the acrylic resin emulsion (A) may preferably contain a crosslinking monomer. The amount of the crosslinking monomer may preferably be 0.2 to 20% by mass based on the total amount of the monomer mixture, and more preferably 0.5 to 20% by mass. The inclusion of the crosslinking monomer in the monomer mixture within the above range offers an advantage that the average particle diameter of the acrylic resin emulsion (A) to be prepared can be suitably controlled to 100 nm or less.

The crosslinking monomer is a compound having two or more radically polymerizable, ethylenically unsaturated groups in the molecule. Examples of the crosslinking monomer include divinyl compounds such as divinylbenzene, ethylene glycol di(meth)acrylate, hexanediol di(meth)acrylate, polyethylene glycol di(meth)acrylate, allyl (meth)acrylate, 1,4-butanediol di(meth)acrylate, 1,6-hexane di(meth) acrylate, neopentylglycol di(meth)acrylate, and pentaerythritol di(meth)acrylate; and polyfunctional monomers such as triallyl cyanurate, pentaerythritol tri(meth) acrylate, trimethylolpropane tri(meth)acrylate, and dipentaerythritol hexa(meth)acrylate; and the like. As to the crosslinking monomer, only one species thereof may be used, or two or more species thereof may be used in combination. Examples of preferred crosslinking monomers may include allyl (meth)acrylate, ethylene glycol di(meth) acrylate, and divinylbenzene. Use of such crosslinking monomers offers an advantage that the average particle diameter of the resulting acrylic resin emulsion (A) can be suitably controlled to 100 nm or less. In the present description, "(meth)acryl" means both acryl and/or methacryl.

The acrylic resin emulsion (A) may preferably have an acid value or a hydroxyl value as necessary. The acid value or the hydroxyl value of the acrylic resin is substantially the same as the acid value or the hydroxyl value of the monomer mixture from which the acrylic resin is synthesized. The monomer mixture may preferably have an acid value of 3 to 50 mg KOH/g, and more preferably 7 to 40 mg KOH/g. From the viewpoint of the curing performance of the coating composition, the monomer mixture may preferably have a hydroxyl value of 10 to 150 mg KOH/g, and more preferably 20 to 100 mg KOH/g. Further, from the viewpoint of the mechanical properties of a resulting coating film, a glass transition temperature of the polymer obtained by copolymerizing the monomer mixture may preferably be −20 to 80° C.

The acrylic resin emulsion (A) is prepared by emulsion-polymerizing the monomer mixture. The emulsion polymerization method may be a polymerization method commonly carried out by those skilled in the art. Specifically, it can be carried out by mixing an emulsifier in water or an aqueous medium containing an organic solvent such as alcohol as necessary, and then dropping the above-described monomer mixture and a polymerization initiator under heating and stirring. Emulsion polymerization can also be carried out by a method involving dropping an emulsified mixture prepared by previously emulsifying a monomer mixture, an emulsifier and water.

Examples of the polymerization initiator include lipophilic azo-based compounds (e.g., azobisisobutyronitrile, 2,2'-azobis(2-methylbutyronitrile), and 2,2'-azobis(2,4-dimethylvaleronitrile)); hydrophilic azo compounds (e.g., 4,4'-azobis(4-cyanovaleric acid) and 2,2-azobis(N-(2-carboxyethyl)-2-methylpropionamidine, which are anionic, and 2,2'-azobis(2-methylpropionamidine), which is cationic); redox-type lipophilic peroxides (e.g., benzoyl peroxide, parachlorobenzoyl peroxide, lauroyl peroxide, and tert-butyl perbenzoate); hydrophilic peroxides (e.g., potassium persulfate and ammonium persulfate); and the like.

As the emulsifier, emulsifiers commonly used by those skilled in the art can be used. As an emulsifier, it may be more preferable to use a reactive emulsifier. Examples of the reactive emulsifier include Antox MS-60 (produced by Nippon Nyukazai Co., Ltd.), Eleminol JS-2 (produced by Sanyo Chemical Industries, Ltd.), ADEKA REASOAP NE-20 (produced by ADEKA, Inc.), Aqualon HS-10 (produced by DKS Co. Ltd.) and the like. The amount of the emulsifier may preferably be 1.05 to 5% by mass, and more preferably 1.1 to 5% by mass, based on the total amount of the monomer mixture.

In order to adjust the molecular weight, a chain transfer agent, such as a mercaptan compound, e.g., lauryl mercaptan, and α-methylstyrene dimer, may be used as necessary.

A reaction temperature is determined depending on an initiator, and for example, the reaction temperature is 60 to 90° C. for azo-based initiators, and when a redox-type initiator is used, the reaction may preferably be carried out at 30 to 70° C. Generally, the reaction time is 1 to 8 hours. The amount of the polymerization initiator based on the total amount of the monomer mixture is generally 0.1 to 5% by mass, and preferably 0.2 to 2% by mass.

The emulsion polymerization may be either one-stage polymerization or multi-stage polymerization. The multi-stage polymerization may be carried out in two stages, for example. Two-stage polymerization is a polymerization method in which a part of the above α,β-ethylenically unsaturated monomer mixture (monomer mixture 1) is first emulsion-polymerized, and the remainder of the above α,β-ethylenically unsaturated monomer mixture (monomer mixture 2) is further added, and followed by carrying out emulsion polymerization.

For example, in the case of performing two-stage polymerization, it may be preferable from the viewpoint of compatibility with a clear coating film, etc. that the monomer mixture 1 contain an α,β-ethylenically unsaturated monomer having an amide group. At this time, it may be more preferable that the monomer mixture 2 does not contain any α,β-ethylenically unsaturated monomer having an amide group. In addition, since an admixture of the monomer mixtures 1 and 2 is the above-described monomer mixture, the requirements of the above-described α,β-ethylenically unsaturated monomer mixture are satisfied by the admixture of the monomer mixtures 1 and 2.

The acrylic resin emulsion can be used at a pH of 5 to 10 by neutralization with a base as necessary. This is because the stability in this pH range is high. Preferably, the neutralization is carried out preferably by adding a tertiary amine such as dimethylethanolamine or triethylamine to the system before or after the emulsion polymerization.

In the present invention, the acrylic resin emulsion (A) is required to have an average particle diameter of 100 nm or less. The average particle diameter of the acrylic resin emulsion (A) may preferably be 20 to 100 nm, more preferably 30 to 100 nm, and even more preferably 40 to 100 nm. When the average particle diameter of the acrylic resin emulsion (A) exceeds 100 nm, the transparency and the light transmittance of a resulting coating film will be poor.

Examples of the method of bringing the average particle diameter of the acrylic resin emulsion (A) into the above range include a method involving adjusting emulsion polymerization conditions and a method involving choosing a monomer composition. The average particle diameter of the acrylic resin emulsion (A) is an average dispersed particle diameter value measured using a dynamic light scattering method using LB-500 (manufactured by Horiba, Ltd.).

The amount of the acrylic resin emulsion (A) contained in the coating film-forming resin (i) may preferably be 10 to 60% by mass, and more preferably 15 to 50% by mass in terms of the resin solid content of the coating film-forming resin (i). When the amount of the acrylic resin emulsion (A) is less than 10% by mass, the physical properties of a coating film may be deteriorated. When the amount of the acrylic resin emulsion (A) exceeds 60% by mass, color unevenness may occur in a resulting coating film.

Water-Soluble Acrylic Resin (B)

The coating film-forming resin (i) contains a water-soluble acrylic resin (B). The amount of the water-soluble acrylic resin (B) may preferably be 5 to 40% by mass, and more preferably 10 to 30% by mass in terms of the resin solid content of the coating film-forming resin (i). When the amount of the water-soluble acrylic resin (B) is less than 5% by mass, the viscosity greatly increases at the time of coating during the application, so that color unevenness may occur in a resulting coating film. When the amount of the water-soluble acrylic resin (B) exceeds 40% by mass, the appearance of a coating film may be poor.

The water-soluble acrylic resin (B) may preferably have a number average molecular weight of 3000 to 50000, and more preferably 6000 to 30000. The fact that the number average molecular weight of the water-soluble acrylic resin (B) is within the above range offers an advantage that good coating workability and good curability can be obtained. In the present description, the number average molecular weight and the weight average molecular weight of a resin component can be determined by gel permeation chromatography (GPC) using a polystyrene standard sample.

The water-soluble acrylic resin (B) may preferably have an acid value of 10 to 100 mg KOH/g, and more preferably 20 to 80 mg KOH/g. The fact that the acid value is within the above range offers an advantage that the dispersibility in water of the water-soluble acrylic resin (B) and the resistance to water of a coating film can be secured. The water-soluble acrylic resin (B) may preferably have a hydroxyl value of 20 to 180 mg KOH/g, and more preferably 30 to 160 mg KOH/g. The fact that the hydroxyl value is in the range offers an advantage that the coating film curability and the resistance water of a coating film can be secured.

The water-soluble acrylic resin (B) can be prepared by carrying out solution polymerization using, as an essential component, an α,β-ethylenically unsaturated monomer having an acid group, which has been disclosed as an example in the monomer mixture to be used for the preparation of the acrylic resin emulsion (A), together with other optional α,β-ethylenically unsaturated monomer.

The water-soluble acrylic resin (B) can be prepared by performing neutralization with a basic compound, e.g., an organic amine such as monomethylamine, dimethylamine, trimethylamine, triethylamine, diisopropylamine, monoethanolamine, diethanolamine and dimethylethanolamine, followed by dissolution in water. The neutralization of the water-soluble acrylic resin (B) may be carried out on the water-soluble acrylic resin (B) alone, or alternatively may be carried out during preparation of the water-based coating composition.

Melamine Resin (C)

The coating film-forming resin (i) contains a melamine resin (C). The melamine resin (C) has a function as a curing agent in the coating film-forming resin. The melamine resin (C) may be either soluble in water or insoluble in water. Use of a resin having a water tolerance of 3.0 or more as the melamine resin (C) offers an advantage that good coating stability can be obtained. Herein, the water tolerance is an index for evaluating the degree of hydrophilicity, and the higher its value, the higher the hydrophilicity. In a method for measuring a water tolerance value, 0.5 g of a sample is mixed and dispersed in 10 ml of acetone in a 100 mL beaker at 25° C., and then ion-exchanged water is added slowly using a burette and the amount (ml) of ion-exchanged water required until the mixture gets cloudy. The amount (ml) of the ion-exchanged water is taken as a water tolerance value.

The amount of the melamine resin (C) may preferably be 20 to 40% by mass in terms of the resin solid content of the coating film-forming resin (i). When the amount of the melamine resin (C) is less than 20% by mass, the coating film curability may be deteriorated. When the amount of the melamine resin (C) exceeds 40% by mass, the coating stability may be deteriorated.

Polyester Resin

The water-based coating composition of the present invention may optionally contain a polyester resin. The polyester resin can be prepared, for example, by condensation-polymerizing an acid component and an alcohol component. The acid component is not particularly limited, and examples thereof include polyvalent carboxylic acid compounds such as adipic acid, sebacic acid, isophthalic acid, and phthalic anhydride, and anhydrides thereof. Furthermore, a compound having a carboxylic acid group and a hydroxyl group in one molecule such as dimethylolpropionic acid can be used as the acid component. The alcohol component is not particularly limited, and examples thereof include polyhydric alcohol compounds such as ethylene glycol, trimethylolpropane, and neopentyl glycol. The polyester resin more preferably have a resin solid acid value of 20 to 80 mg KOH/g and a number average molecular weight of 1,000 to 15,000. Inclusion of a polyester resin in the water-based coating composition of the present invention offers an advantage that color unevenness of a resulting coating film can be suppressed. When the water-based coating composition contains a polyester resin, the amount of the polyester resin in terms of resin solid content may preferably be 5 to 30% by mass, and more preferably 10 to 20% by mass.

The water-based coating composition of the present invention may optionally contain other curing agents in addition to the above-described melamine resin (C). As such other curing agents, those commonly used in coatings can be used. Examples of such other curing agents include blocked isocyanate, epoxy compounds, aziridine compounds, carbodiimide compounds, oxazoline compounds, and metal ions.

It may be preferred to contain a blocked isocyanate resin as the other curing agent. The blocked isocyanate resin is a resin obtainable by adding a blocking agent having an active hydrogen to a polyisocyanate, such as trimethylene diisocyanate, hexamethylene diisocyanate, xylylene diisocyanate, and isophorone diisocyanate, and may be one that, upon heating, allows a blocking agent to dissociate and generates an isocyanate group.

The coating film-forming resin (i) can be prepared by mixing the above-described acrylic resin emulsion (A), water-soluble acrylic resin (B), melamine resin (C), and optionally polyester resin and other resins.

Coloring Pigment Dispersion (ii)

The water-based coating composition of the present invention contains the above-described coating film-forming resin (i) and a coloring pigment dispersion (ii). The coloring pigment dispersion (ii) contains a coloring pigment (D). In the present invention, the coloring pigment (D) contained in the coloring pigment dispersion (ii) is required to have a 90%-volume particle diameter (D90) of 100 nm or less. In the water-based coating composition of the present invention, thanks to the use of the above-described specific acrylic resin emulsion (i) and the fact that the 90%-volume particle diameter (D90) of the coloring pigment (D) contained in the coloring pigment dispersion (ii) is 100 nm or less, it is possible to form a color clear coating film being high in chroma and brightness.

The 90%-volume particle diameter (D90) of the coloring pigment (D) may preferably be 55 nm or less, more preferably 35 nm or less, and even more preferably 10 nm or less.

The 90%-volume particle diameter (D90) is an index indicating particle size distribution and is also referred to as a volume cumulative particle diameter D90. Specifically, where the total volume of the particles integrated in the particle size distribution of the coloring pigment (D) from the smaller particle diameter side to a certain particle diameter is expressed as a percentage based on the total volume of all particles, the particle diameter with a value of the percentage of 90% is adopted. The 90%-volume particle diameter (D90) can be measured using a dynamic light scattering method, specifically, UPA-150 (a particle size distribution analyzer manufactured by Microtrac, Inc.).

The coloring pigment (D) may be either an organic coloring pigment or an inorganic coloring pigment, or may be a combination thereof. Examples of the organic coloring pigment include azo-chelate-based pigments, insoluble azo-based pigments, condensed azo-based pigments, diketopyrrolopyrrole-based pigments, phthalocyanine-based pigments, indigo pigments, perinone-based pigments, perylene-based pigments, dioxane-based pigments, quinacridone-based pigments, isoindolinone-based pigments, and metal complex pigments. Examples of the inorganic coloring pigment include chrome yellow, yellow iron oxide, colcothar, carbon black, and titanium dioxide. As to these coloring pigments, one species thereof may be used singly, or two or more species thereof may be used in combination.

As the coloring pigment (D), for example, phthalocyanine-based pigments, diketopyrrolopyrrole-based pigments, perylene-based pigments, colcothar, etc. can be particularly suitably used. Use of these coloring pigments offers an advantage that it is possible to form a coating film high in chroma and brightness and superior in deep feeling of color.

The amount of the coloring pigment (D) contained in the water-based coating composition of the present invention may preferably be in a range of 0.1 to 25 parts by mass based on 100 parts by mass of the resin solid content of the coating film-forming resin (i). The amount of the coloring pigment is more preferably in the range of 0.5 to 20 parts by mass, and even more preferably in the range of 1 to 10 parts by mass. Thanks to the inclusion of the coloring pigment (D) in the above range, the chroma of a resulting color clear coating film can be secured.

The water-based coating composition of the present invention may, as necessary, contain an additional pigment other than the above-described coloring pigment (D). However, such an additional pigment is required not to greatly impair the transparency of the water-based coating composition of the present invention. The additional pigment to be used may be appropriately selected from among pigments commonly used in the field of coating.

The coloring pigment dispersion (ii) can be prepared by mixing and dispersing the coloring pigment (D) and a pigment dispersing agent in an aqueous medium. As the pigment dispersing agent, a resin having a structure containing a pigment affinity moiety and a hydrophilic moiety can be used. Examples of the pigment affinity moiety and the hydrophilic moiety include nonionic, cationic, and anionic functional groups, and the pigment dispersing agent may have two or more such functional groups in one molecule thereof. Examples of the nonionic functional group include a hydroxyl group, an amide group, and a polyoxyalkylene group, and examples of the cationic functional group include an amino group, an imino group, and a hydrazino group. Examples of the anionic functional group include a carboxyl group, a sulfonic acid group, and a phosphoric acid group. Such pigment dispersing agents can be produced by methods well known to those skilled in the art.

Examples of the pigment dispersing agent include nonionic pigment dispersing agents and polymer pigment dispersing agents.

Examples of the nonionic pigment dispersing agents include dispersing agents having an alkyl chain having 14 or more carbon atoms, preferably 14 to 30, and more preferably 16 to 25 carbon atoms. The nonionic pigment dispersing agent may preferably have a hydrophilic-lipophilic balance (HLB) of 16 or more, more preferably 16 to 20, and even more preferably 17 to 19. Examples of the nonionic pigment dispersing agent include polyoxyethylene stearyl ether, polyoxyethylene oleyl ether, and polyoxyethylene 2-octyl-dodidecyl ether, and modified products thereof (e.g., sulfuric acid ester-, phosphoric acid ester-, or maleic acid ester-modified products).

The polymer pigment dispersing agent is not particularly limited, and those described below can be suitably used.

(1) Comb-structured polymer pigment dispersing agents having a pigment affinity group in the main chain and/or a plurality of side chains and having a plurality of side chains constituting a solvate moiety (2) Polymer pigment dispersing agents having a plurality of pigment affinity moieties formed of pigment affinity groups in the main chain (3) Linear polymer pigment dispersing agents having a pigment affinity moiety formed of a pigment affinity group at one end of the main chain Herein the pigment affinity group refers to a functional group having strong adsorptive power to the surface of a pigment; examples thereof include, in an organosol, a tertiary amino group, a quaternary ammonium group, a heterocyclic group having a basic nitrogen atom, a hydroxyl group, and a carboxyl group; and in a hydrosol, a phenyl group, a lauryl group, a stearyl group, a dodecyl group, and an oleyl group.

The comb-structured polymer pigment dispersing agent (1) is one having a structure in which a plurality of side chains constituting a solvate moiety are attached to the main chain together with the main chain and/or a plurality of side chains having the pigment affinity group with the side chains being attached to the main chain as if they were comb teeth. In the present description, the above-described structure is referred to as a comb structure. In the comb-structured polymer pigment dispersing agent (1), a plurality of the pigment affinity groups may exist in not limited to a side-chain end, but in the middle of a side chain or the main chain. It is noted that the solvate moiety refers to a structure having affinity with a solvent. The solvate moiety is composed of, for example, a water-soluble polymer chain, a lipophilic polymer chain, or the like.

The comb-structured polymer pigment dispersing agent (1) is not particularly limited, and examples thereof include a polymer composed of poly(ethylenimine) or its acid salt with a structure that has one or more poly(carbonyl-carbonyl-$C_3$ to $C_6$-alkyleneoxy) chains, and where each of these chains has 3 to 80 carbonyl-$C_3$ to $C_6$-alkyleneoxy groups, and that is bound to poly(ethylenimine) with amide or a salt cross-linked group disclosed in JP-A-5(1993)-177123; a polymer that is composed of a reactive product of poly (lower alkylene) imine and polyester having an isolated carboxylic acid group, and where at least two polyester closed-chains are bound to each poly (lower alkylene) imine closed-chain disclosed in JP-A-54(1979)-37082; a pigment dispersant that is obtained by reacting an amine compound and a pre-polymer containing a carboxyl group with 300 to 7,000 of number average molecular weight to a high-molecular-weight epoxy compound having an epoxy group at the terminal simultaneously or in optional sequence disclosed in JP-B-7(1995)-24746; and the like.

The comb-structured polymer pigment dispersing agent (1) may preferably be one having 2 to 3000 pigment affinity groups in one molecule. When the number of that group is less than 2, the dispersion stability may not be sufficient, and when it exceeds 3,000, the viscosity may be excessively high and handling may be difficult. More preferably, it may be 25 to 1,500.

The comb-structured polymer pigment dispersing agent (1) may preferably be one having 2 to 1000 of side chains constituting a solvate moiety in one molecule. When the number of that group is less than 2, the dispersion stability may not be sufficient, and when it exceeds 1000, the viscosity may be excessively high and handling may be difficult. More preferably, it may be 5 to 500.

The comb-structured polymer pigment dispersing agent (1) may preferably have a number average molecular weight of 2000 to 1000000. When it is less than 2000, the dispersion stability may not be sufficient, and when it exceeds 1000000, the viscosity may be excessively high and handling may be difficult. More preferably, it may be 4000 to 500000.

The polymer pigment dispersing agent (2) having, in the main chain, a plurality of pigment affinity moieties formed of pigment affinity groups is one in which a plurality of the pigment affinity groups are disposed along the main chain and the pigment affinity groups are attached to the main chain like pendants, for example. In the present description, the above-mentioned pigment affinity moiety refers to a moiety that functions as an anchor that adsorbs to the surface of a pigment while having one or more of the above-mentioned pigment affinity groups.

Examples of the above-described polymer pigment dispersing agent (2) include a reactant with polyisocyanate, a mixture of a monohydroxy compound and monohydroxy monocarboxylic acid or a monoamino monocarboxylic acid compound, and a compound having at least one basic ring nitrogen and an isocyanate reactive group disclosed in JP-A-4(1992)-210220; a polymer where a plurality of tertiary amino groups or groups having a basic cyclic nitrogen atom are attached to a main chain composed of polyurethane/polyurea disclosed in JP-A-60(1985)-16631, JP-A-2

(1990)-612, and JP-A-63(1988)-241018; copolymer that is a copolymer composed of a steric stabilization unit having a water-soluble poly (oxyalkylene) chain, a structure unit and an amino group-containing unit, and where the amine group-containing single dose monomer unit contains a tertiary amino group or a group of its acid addition salt or a group of quaternary ammonium, and that contains an amino group equivalent to 0.025 mm to 0.5 mm per gram of the copolymer disclosed in JP-A-1(1989)-279919; and an amphiphilic polymer that is an amphiphilic polymer composed of a main chain made from an addition polymer and a stabilization unit made from at least one $C_1$-$C_4$ alkoxypolyethylene or polyethylene-copropylene glycol (meth) acrylate, and, having 2500 to 20000 of mass-average molecular weight, wherein the main chain contains up to 30% by mass of a nonfunctional structure unit and a total of up to 70% by mass of a stabilizer unit and a functional unit; the functional unit is substituted or not-substituted styrene-containing unit, a hydroxyl group unit and a carboxyl group-containing unit; and ratios of a hydroxyl group to a carboxyl group, a hydroxyl group to a styrene group and a hydroxyl group to a propyleneoxy group or an ethyleneoxy group are 1:0.10 to 26.1, 1:0.28 to 25.0, and 1:0.80 to 66.1, respectively, disclosed in JP-A-6(1994)-100642.

The polymer pigment dispersing agent (2) may preferably be one having 2 to 3,000 pigment affinity groups in one molecule. When the number of that group is less than 2, the dispersion stability may not be sufficient, and when it exceeds 3000, the viscosity may be excessively high and handling may be difficult, and the chroma may deteriorate. More preferably, it may be 25 to 1,500.

The polymer pigment dispersing agent (2) may preferably have a number average molecular weight of 2000 to 1000000. When it is less than 2000, the dispersion stability may not be sufficient, and when it exceeds 1000000, the viscosity may be excessively high and handling may be difficult. More preferably, it may be 4000 to 500000.

The linear polymer pigment dispersing agent (3) having a pigment affinity moiety formed of a pigment affinity group at one end of the main chain has a pigment affinity moiety composed of one or two or more pigment affinity groups only at one end of the main chain, and has sufficient affinity to a pigment surface.

The linear polymer pigment dispersing agent (3) is not particularly limited, and examples thereof include an A-B block type polymer where one is basic, disclosed in JP-A-46(1971)-7294; an A-B block type polymer where an aromatic carboxylic acid is introduced into an A block, disclosed in the specification of U.S. Pat. No. 4,656,226; an A-B block type polymer where one end is a basic functional group, disclosed in the specification of U.S. Pat. No. 4,032,698; an A-B block type polymer where one end is an acidic functional group, disclosed in the specification of U.S. Pat. No. 4,070,388; and one where weathering and yellowing deterioration of the A-B block type polymer, where an aromatic carboxylic acid is introduced into an A block, described in the specification of U.S. Pat. No. 4,656,226 has been improved as disclosed in JP-A-1(1989)-204914.

The linear polymeric pigment dispersing agent (3) may preferably have 2 to 3000 pigment affinity groups in one molecule. When the number of that group is less than 2, the dispersion stability may not be sufficient, and when it exceeds 3,000, the viscosity may be excessively high and handling may be difficult. More preferably, it may be 5 to 1500.

The linear polymer pigment dispersing agent (3) may preferably have a number average molecular weight of 1000 to 1000000. When it is less than 1000, the dispersion stability may not be sufficient, and when it exceeds 1000000, the viscosity may be excessively high and handling may be difficult. More preferably, it may be 2000 to 500000.

In the present invention, it may be more preferable to use the comb-structured polymer pigment dispersing agent (1) as the pigment dispersing agent from the viewpoint of the transparency of a coating film to be obtained from the coating composition.

Various pigment dispersing agents can be used as the pigment dispersing agent, but commercially available products can also be used. Examples of such commercially available products include those listed below.

Dispex Ultra FA4404, Dispex Ultra FA4416, Dispex Ultra FA4425, Dispex Ultra FA4431, Dispex Ultra FA4437, Dispex Ultra FA4480, Dispex Ultra FA4483, Dispex Ultra PA4550, Dispex Ultra PA4560, Dispex Ultra PX4575, and Dispex Ultra PX4585 (all produced by BASF).

TEGO Dispers 650, TEGO Dispers 651, TEGO Dispers 652, TEGO Dispers 655, TEGO Dispers 660C, TEGO Dispers 715W, TEGO Dispers 740W, TEGO Dispers 750W, TEGO Dispers 752W, TEGO Dispers 755W, and TEGO Dispers 760W (all produced by Evonik).

Solsperse 12000S, Solsperse 20000, Solsperse 27000, Solsperse 40000, Solsperse 41090, Solsperse 43000, Solsperse 44000, Solsperse 45000, Solsperse 46000, Solsperse 47000, Solsperse 53095, Solsperse 64000, Solsperse 65000, Solsperse 66000, Solsperse 67000, and Solsperse WV400 (all produced by Lubrizol).

Floren G-700AMP, Floren G-700DMEA, Floren GW-1500, and Floren GW-1640 (all produced by Kyoeisha Chemical Co., Ltd.).

DISPARLON DA-703-50, DISPARLON DA-7301, and DISPARLON DN-900 (all produced by Kusumoto Chemicals, Ltd.).

ANTI-TERRA-250, DISPERBYK, DISPERBYK-102, DISPERBYK-180, DISPERBYK-184, DISPERBYK-185, DISPERBYK-187, DISPERBYK-190, DISPERBYK-191, DISPERBYK-192, DISPERBYK-193, DISPERBYK-194N, DISPERBYK-198, DISPERBYK-199, DISPERBYK-2010, DISPERBYK-2012, DISPERBYK-2013, DISPERBYK-2015, and DISPERBYK-2096 (all produced by BYK).

The above pigment dispersing agents may be used singly or two or more of them may be used in combination.

The coloring pigment dispersion (ii) can be prepared by mixing and dispersing the coloring pigment (D) and the pigment dispersing agent. The amount of the pigment dispersing agent contained in the coloring pigment dispersion (ii) may preferably be 50 to 200 parts by mass (solid content part by mass), more preferably 65 to 150 parts by mass (solid content part by mass), of the pigment dispersing agent based on 100 parts by mass of the coloring pigment. The fact that the amount of the pigment dispersing agent is within the above range offers an advantage that good dispersion stability of the coloring pigment and good physical properties of a resulting coating film can be obtained. In particular, use of the pigment dispersing agent in an amount within the above range offers an advantage that the 90%-volume particle diameter of the coloring pigment dispersion can be suitably adjusted to 100 nm or less.

The preparation of the pigment dispersion (ii) can be carried out by mixing the coloring pigment (D), the pigment dispersing agent, and an aqueous medium. Examples of the aqueous medium include water and optional organic solvents (e.g., alcoholic solvents).

The mixing of the coloring pigment (D), the pigment dispersing agent and the aqueous medium in the preparation of the pigment dispersion (ii) can be carried out using, for example, a medium dispersing machine or the like. The medium dispersing machine is not particularly limited, and examples thereof include Ultra Apex Mill, Dual Apex Mill (trade names of Kotobuki Industries Co., Ltd.), Paint Shaker, Pico Grain Mill, Eco Mill (trade names of Asada Iron Works, Co., Ltd.), Star Mill ZRS, Star Mill, Nano Getter, Max Nano Getter (trade names of Ashizawa Finetech Ltd.), Micromedia (trade names of Bühler AG), MSC Mill (trade name of Nippon Coke & Engineering Co., Ltd.), NPM (Shinmaru Enterprises Corporation), and Sand Mill.

As a dispersion medium that can be used in the mixing and dispersion using a medium dispersing machine, for example, a dispersion medium having a particle diameter of 0.3 mm or less, more preferably 0.1 mm or less, and even more preferably 0.05 mm or less can be used. A dispersion medium having a particle diameter of 0.05 mm or less is also referred to as an ultrafine medium, and can be particularly suitably used in the preparation of the pigment dispersion (ii) in the present invention. The lower limit of the particle diameter of the dispersion medium may preferably be 0.03 mm, and more preferably 0.05 mm, from the viewpoint of the progress of mixing and dispersion.

In the mixing and dispersion using a medium dispersing machine, the medium loading in the dispersing machine may preferably be 50% by volume or more, more preferably 60% by volume or more, and even more preferably 70% by volume or more based on the volume of the dispersing machine.

The material of the dispersion medium particles is not particularly limited, and examples thereof include alumina, zirconia, silicon carbide, silicon nitride, glass, steel, stainless steel, and pottery. The material of the dispersion medium particles may preferably be zirconia from the viewpoint of dispersion efficiency, etc.

The rotation speed of the agitator of the medium dispersing machine may preferably be 500 rpm or more, more preferably 1000 rpm or more, and even more preferably 1500 rpm or more. The upper limit of the rotation speed may preferably be 5000 rpm or less.

The medium dispersing machine may have a separator unit, if necessary. When the medium dispersing machine has a separator portion, the dispersion medium particles can be well separated. The separator unit may have, for example, a rotation shaft. When the separator unit has a rotation shaft, the dispersion medium particles can be separated by rotation (for example, centrifugal separation). In this case, the rotation speed of the rotation shaft of the separator can be appropriately chosen depending on the viscosity of the contents. The rotation speed may be, for example, 2000 rpm or more, more preferably 3000 rpm or more, and even more preferably 4000 rpm or more.

Although the mixing and dispersing time by the medium dispersing machine varies depending on the scale, etc., for example, the residence time in the dispersing machine may preferably be 30 to 200 minutes, and more preferably 60 to 150 minutes. As to the mixing and dispersing temperature, the mixing and dispersion may be carried out, for example, under the condition of 5 to 45° C., and more preferably carried out under the condition of 20 to 40° C.

In the preparation of the coloring pigment dispersion (ii), the 90%-volume particle diameter (D90) of the coloring pigment (D) contained in the coloring pigment dispersion (ii) can suitably be adjusted to 100 nm or less by performing the above-described mixing and dispersion.

Preparation of Water-Based Coating Composition

The water-based coating composition of the present invention can be prepared by mixing a coating film-forming resin (i) containing an acrylic resin emulsion (A) having an average particle diameter of 100 nm or less, in an amount of 10 to 60% by mass in terms of the resin solid content of the coating film-forming resin (i), a water-soluble acrylic resin (B) in an amount of 5 to 40% by mass in terms of the resin solid content of the coating film-forming resin (i), and a melamine resin (C) in an amount of 20 to 40% by mass in terms of the resin solid content of the coating film-forming resin (i), with the above-described coloring pigment dispersion (ii). The mixing of the coating film-forming resin (i) with the coloring pigment dispersion (ii) can be carried out using a stirring and mixing machine commonly used in the coating field (e.g., a disper and a dissolver). Although the stirring time varies depending on the mixing scale, etc., it may preferably be 0.1 to 10 hours, and more preferably 0.5 to 5 hours. The stirring temperature may be room temperature, and the stirring may be carried out, for example, under the condition of 20 to 30° C.

The water-based coating composition of the present invention may, if necessary, contain additives commonly used in the coating field, such as a surface conditioner, an antioxidant, a UV inhibitor, and an antifoaming agent.

The water-based coating composition of the present invention may further contain a viscosity control agent in order to prevent the coating films from becoming familiar with each other and secure coating workability. As for the viscosity control agent, a viscosity control agent that exhibits a thixotropic property can be commonly used. Examples of the viscosity control agent include crosslinked or non-crosslinked resin particles; polyimide-based materials such as a swelling dispersion of aliphatic acid amide, amide-based aliphatic acid, and phosphates of long-chain polyaminoamide; polyethylene-based materials such as a colloidal swelling dispersion of polyethylene oxide; organic bentonite-based materials such as organic acid smectite clay and montmorillonite; inorganic pigments such as aluminum silicate and barium sulfate; and flat pigments capable of developing viscosity depending on a shape of the pigment.

In the present invention, with respect to a composition for haze measurement that is a composition composed of the coating film-forming resin (i) and the coloring pigment dispersion (ii), wherein the amount of the coloring pigment (D) contained in the composition is 4% by mass based on 100 parts by mass of the resin solid content of the coating film-forming resin (i), a 25 µm-thick cured coating film may preferably have a haze value of 8 or less. The "composition for haze measurement" as referred to in the present description is a composition for measuring the haze value of a cured coating film of a composition in which the amount of the coloring pigment (D) is specified like "the amount of the coloring pigment (D) is 4% by mass based on 100 parts by mass of the resin solid content of the coating film-forming resin (i)". By setting the amount of the coloring pigment (D) contained in the composition to a specific value, it is possible to investigate effects caused by the average particle diameter of the acrylic resin emulsion contained in the coating film-forming resin (i) and the 90%-volume particle diameter (D90) of the coloring pigment (D) contained in the coloring pigment dispersion (ii).

The above haze value can be measured by measuring the haze value of a 25 µm-thick cured coating film obtained by applying the composition for haze measurement to a glass sheet or a PET film using a 6 mil applicator, and then curing it.

The total light transmittance (Tt) and the scattered light transmittance (Td) of the cured coating film are measured using a commercially available haze meter, and then the haze value is calculated using the following formula.

$$\text{Haze value (Th)} = \text{scattered light transmittance (Td)} / \text{total light transmittance (Tt)} \times 100$$

Multilayer Coating Film

The present invention also provides a multilayer coating film and a method for forming a multilayer coating film. Examples of the multilayer coating film include a multilayer coating film containing a first base coating film and a second base coating film, wherein the first base coating film contains at least one pigment selected from the group consisting of a luster pigment and a coloring pigment, and the second base coating film is a cured coating film of the above water-based coating composition.

Examples of an object to be coated to be used for the formation of a multilayer coating film include various substrates such as a metal shaped article, a plastic shaped article, and a foamed article. The water-based coating composition of the present invention can be suitably used in the coating of automobile exterior panels such as automobile bodies and automobile parts.

Examples of the metal shaped article include plates and shaped articles of iron, copper, aluminum, tin, zinc, etc., and alloys containing these metals, and specifically include bodies and parts of motorcars such as automobiles, trucks, motorcycles, and buses.

The metal shaped article may have been subjected to chemical conversion treatment in advance with phosphate, zirconium salt, chromate, or the like, and subsequent formation of an electrodeposition coating film. Examples of the electrodeposition coating composition which can be used for the formation of an electrodeposition coating film include a cationic electrodeposition coating composition and an anionic electrodeposition coating composition.

Examples of the plastic shaped article include plates and shaped articles of polypropylene resin, polycarbonate resin, urethane resin, polyester resin, polystyrene resin, ABS resin, vinyl chloride resin, polyamide resin, and the like. Examples of the plastic shaped articles include automobile parts such as spoilers, bumpers, mirror covers, grills, and doorknobs. These plastic shaped articles may have been provided with primer coating in order to enable electrostatic coating.

An intermediate coating film may further have been formed on the above-mentioned object to be coated as necessary. An intermediate coating composition is used to form the intermediate coating film. As the intermediate coating composition, for example, a coating composition containing a coating film-forming resin, a curing agent, various organic and/or inorganic coloring components, an extender, etc. can be used. The coating film-forming resin and the curing agent are not particularly limited, and the coating film-forming resins and the curing agents cited in the description on the above-described water-based coating composition can be used. As the coating film-forming resin of the intermediate coating composition, a combination of an acrylic resin and/or a polyester resin with an amino resin and/or an isocyanate is suitably used from the viewpoint of various performances of a resulting intermediate coated film.

Examples the coloring component contained in the intermediate coating include a coloring component mainly composed of carbon black and titanium dioxide (gray intermediate coating composition) and a coloring component that exhibits a hue similar to that of the top-coat base coating film (so-called color intermediate coating composition).

The first base coating composition to be used for the formation the first base coating film may be a coating composition containing a coating film-forming resin and at least one pigment selected from the group consisting of a luster pigment and a coloring pigment. As the coating film-forming resin, the coating film-forming resins cited in the description on the above-described water-based coating composition can be used. As the coloring pigment, the coloring pigments cited in the description on the above-described water-based coating composition can be used.

The luster pigment is not particularly limited in shape and may be colored and may preferably have, for example, an average particle diameter (D50) of 2 to 50 μm and a thickness of 0.1 to 5 μm. Those having an average particle diameter in a range of 10 to 35 μm are superior in glitter feeling and are more suitably used. Examples thereof include non-colored or colored metallic luster pigments, such as metals and mixtures thereof, such as aluminum, copper, zinc, iron, nickel, tin, and aluminum oxide, and alloys thereof. As the luster pigment, besides those mentioned above, an interferential mica pigment, a white mica pigment, a graphite pigment, or the like may also be used.

The first base coating composition may, as necessary, contain an extender pigment commonly used in the coating field.

The first base coating composition can be prepared, for example, by the procedures of the preparation of the above-described water-based coating composition and techniques commonly used in the coating field.

The first base coating composition can be applied by application methods commonly used in the coating field. Examples of such application methods include multistage application, preferably two-stage application, with use of air-electrostatic spray application, or application combining air electrostatic spray application and a rotary atomization type electrostatic applicator. The thickness of the first base coating film may preferably be in a range of 3 to 20 μm.

In the formation of a multilayer coating film, after the application of the first base coating composition, the second base coating composition may be applied by wet-on-wet without curing the first one. Here, drying or preheating may, if necessary, be carried out after applying the first base coating composition and before applying the second base coating composition. Alternatively, after the application of the first base coating composition, the resulting coating film may be heat cured and then followed by the application of the second base coating composition onto the cured first coating film.

Wet-on-wet application is advantages in terms of economy and environmental impact because it can omit a baking dryer.

In the formation of a multilayer coating film, the above-described water-based coating composition can be used as the second base coating composition. By using the water-based coating composition as the second base coating composition, it is possible to form a second base coating film that is called a color clear coating film.

The second base coating composition may be applied by the same method as that of the first base coating composition. The thickness of the second base coating film may preferably be in a range of 3 to 20 μm.

In the formation of the multilayer coating film, a multilayer coating film being high in chroma and brightness, superior in deep feeling of color, and also high in design property and visual attractability, called a candy color coating film, can be obtained by forming a first base coating film using a first base coating composition containing a coloring pigment and a luster pigment, and then forming a color clear coating film using the above-described water-based coating composition as the second base coating composition.

The uncured second base coating film obtained by the application of the second coating composition may be heat cured to cure the uncured coating film. Alternatively, the clear coating composition may be applied onto the uncured second base coating film to form a clear coating film on the uncured second base coating film. In the case of applying the clear coating composition onto the uncured second base coating film, drying or preheating may, as necessary, be performed before applying the clear coating composition.

The clear coating composition is not particularly limited, and examples thereof include solvent-based type, water-based type and powder type clear coating compositions.

From the viewpoint of transparency or resistance to acid etching, preferred examples of the above-mentioned solvent type clear coating composition include a combination of an acrylic resin and/or a polyester resin with an amino resin and/or an isocyanate, or an acrylic resin and/or a polyester resin with a carboxylic acid/epoxy curing system.

Examples of the water-based type clear coating composition include one containing a water-borne resin prepared by neutralizing a coating film-forming resin cited as an example of the above-described solvent type clear coating composition, with a base. The neutralization may be carried out before or after polymerization by adding a tertiary amine such as dimethylethanolamine and triethylamine.

These solvent type clear coating compositions and water-based type clear coating compositions preferably contain a viscosity control agent in order to secure coating workability. As the viscosity control agent, one that exhibits a thixotropic property can be commonly used. Examples of the viscosity control agent include those cited as examples in the above description of the water-based coating composition. In addition, additives commonly used in the coating field may optionally be included.

As a powder type clear coating composition, for example, a powder coating composition commonly used in the coating field can be used, such as a thermoplastic powder coating composition and a thermosetting powder coating composition. Among these, a thermosetting powder coating composition is preferred in view of coating film properties, etc. Examples of the thermosetting powder coating composition include epoxy-based, acrylic-based and polyester-based powder clear coating compositions.

The application of the clear coating composition can be carried out using an application method known to those skilled in the art according to the mode of application of the clear coating composition. In general, the dry thickness of a clear coating film to be formed by applying the above-described clear coating composition may preferably be 10 to 80 μm, and more preferably 20 to 60 μm.

By heat curing an uncured clear coating film resulting from the application of a clear coating composition, a cured clear coating film can be formed. When the clear coating composition has been applied onto an uncured second base coating film, the uncured coating film is to be heat cured by heating. The heat curing temperature may preferably be set to 80 to 180° C., and more preferably 120 to 160° C., from the viewpoint of curability and physical properties of a resulting multilayer coating film. The heat curing time may be set arbitrarily according to the above-mentioned temperature. Examples of the heat curing conditions include conditions where heating is performed at a heat curing temperature of 120° C. to 160° C. for 10 minutes to 30 minutes.

In the formation of a multilayer coating film, examples of methods for forming a first base coating film, a second base coating film, and an optional clear coating film include the following methods.

(1) A method in which the first base coating composition is applied to form an uncured first base coating film, then the second base coating composition is applied to form an uncured second base coating film, then the clear coating composition is applied to form an uncured clear coating film, and the resulting three layers are heat cured at once.

(2) A method in which the first base coating composition is applied to form an uncured first base coating film, then the second base coating composition is applied to form an uncured second base coating film, and then the resulting two layers are heat cured at once. After the heat curing, a clear coating film may be provided, if necessary.

(3) A method in which the first base coating composition is applied to form an uncured first base coating film, then the clear coating composition is applied to form an uncured clear coating film, then the resulting two layers are heat cured at once, then the second base coating composition is applied to form an uncured second base coating film, then the clear coating composition is applied to form an uncured clear coating film, and then the resulting two layers are heat cured at once.

EXAMPLES

Hereafter, the present invention will be described in detail by way of examples, but the present invention is not limited by the following examples. In the following, "parts" means "parts by mass".

Production Example 1 Production of Acrylic Resin Emulsion 1

126.5 parts of deionized water was added to a reaction vessel, and the temperature was raised to 80° C. while mixing and stirring in a nitrogen stream. Subsequently, 100 parts of a monomer mixture of 27.61 parts of methyl acrylate, 53.04 parts of ethyl acrylate, 4.00 parts of styrene, 9.28 parts of 2-hydroxyethyl methacrylate, 3.07 parts of methacrylic acid, and 3.00 parts of allyl methacrylate, a monomer emulsion composed of 0.7 parts of Aqualon HS-10 (polyoxyethylene alkylpropenylphenyl ether sulfate, produced by DKS Co. Ltd.), 0.5 parts of ADEKA REA-SOAP NE-20 (α-[1-[(allyloxy)methyl]-2-(nonylphenoxy) ethyl]-ω-hydroxyoxyethylene, produced by ADEKA Corp.), and 80 parts of deionized water, and an initiator solution composed of 0.3 parts of ammonium persulfate and 10 parts of deionized water were dropped in parallel into the reaction vessel over 2 hours. After the completion of the dropping, aging was carried out at that temperature for 2 hours. Subsequently, the mixture was cooled to 40° C. and filtered through a 400 mesh filter, and then 70 parts of deionized water and 0.32 parts of dimethylaminoethanol were added to adjust to pH 6.5, and thus a single-layer acrylic resin emulsion 1 having an average particle diameter of 88 nm, a nonvolatile content of 25%, a solid acid value of 20 mg KOH/g, and a hydroxyl value of 40 mg KOH/g was obtained.

Comparative Production Example 1 Production of
Acrylic Resin Emulsion 2

A single-layer acrylic resin emulsion 2 having an average particle diameter of 312 nm, a nonvolatile content of 30%, a solid acid value of 20 mg KOH/g, and a hydroxyl value of 40 mg KOH/g was obtained in the same manner as in Production Example 1 except that the amount of Aqualon HS-10 was changed from 0.7 parts to 0.35 parts in Production Example 1.

Comparative Production Example 2 Production of
Acrylic Resin Emulsion 3

A single-layer acrylic resin emulsion 3 having an average particle diameter of 138 nm, a nonvolatile content of 30%, a solid acid value of 20 mg KOH/g, and a hydroxyl value of 40 mg KOH/g was obtained in the same manner as in Production Example 1 except that the amount of Aqualon HS-10 was changed from 0.7 parts to 0.5 parts in Production Example 1.

The average particle diameter of the acrylic resin emulsions 1 to 3 was measured by a dynamic light scattering method using LB-500 (manufactured by Horiba, Ltd.).

Specifically, ion-exchanged water was put in a dedicated cell and an acrylic resin emulsion was added and stirred. Then, the resin solid content concentration was adjusted to 0.1% by mass and measurement was performed using a dynamic light scattering particle size analyzer LB-500 (manufactured by Horiba, Ltd.) at 20° C.

Production Example 2 Production of Water-Soluble
Acrylic Resin 23.89 parts of tripropylene glycol methyl ether and 16.11 parts of propylene glycol methyl ether were added to a reaction vessel, and the temperature was raised to 105° C. while mixing and stirring in a nitrogen stream. Subsequently, a monomer mixture of 13.1 parts of methyl methacrylate, 68.4 parts of ethyl acrylate, 11.6 parts of 2-hydroxyethyl methacrylate, and 6.9 parts of methacrylic acid was prepared, and 100 parts of the monomer mixture and an initiator solution composed of 10.0 parts of tripropylene glycol methyl ether and 1 part of tert-butyl peroxy-2-ethylhexanoate were dropped in parallel into the reaction vessel over 3 hours. After the completion of the dropping, aging was carried out at that temperature for 0.5 hours.

Furthermore, an initiator solution composed of 5.0 parts of tripropylene glycol methyl ether and 0.3 parts of tert-butyl peroxy-2-ethylhexanoate was dropped into the reaction vessel over 0.5 hours. After the completion of the dropping, aging was carried out at that temperature for 2 hours.

After removing 16.1 parts of the solvent at 110° C. under reduced pressure (70 torr) with a desolvating apparatus, 204 parts of deionized water and 7.1 parts of dimethylaminoethanol were added to obtain a water-soluble acrylic resin solution. The water-soluble acrylic resin solution obtained had a nonvolatile content of 30%, a solid acid value of 40 mg KOH/g, a hydroxyl value of 50 mg KOH/g, and a viscosity of 140 poise (E-type viscometer, 1 rpm/25° C.).

Production Example 3 Production of Polyester
Resin

A reaction vessel equipped with a stirrer, a condenser and a thermometer was charged with 372 parts of dimethylterephthalic acid, 380 parts of dimethylisophthalic acid, 576 parts of 2-methyl-1,3-propanediol, 222 parts of 1,5-pentanediol, and 0.41 parts of tetrabutyl titanate, and a transesterification reaction was performed over 4 hours while raising the temperature from 160° C. to 230° C. Subsequently, the system was gradually depressurized and the pressure was reduced to 5 mmHg over 20 minutes, further reduced to a vacuum of 0.3 mmHg or less, and a polycondensation reaction was performed at 260° C. for 40 minutes. The mixture was cooled to 220° C. in a nitrogen atmosphere, 23 parts of trimellitic anhydride was then added, and a reaction was performed at 220° C. for 30 minutes to obtain a polyester resin. The NMR composition analysis of the obtained polyester resin revealed that the carboxylic acid components were terephthalic acid/isophthalic acid/trimellitic acid=48/49/3 in molar ratio, and the polyol components were 2-methyl-1,3-propanediol/1,5-pentanediol=65/35 in molar ratio. That is, where the total amount of the polycarboxylic acid components and the polyol components is 100 mol %, aromatic dicarboxylic acids accounted for 97 mol %, isophthalic acid accounted for 49 mol %, the prescribed diols accounted for 65 mol % in total, and ethylene glycol accounted for 0 mol %.

The characteristic values of the obtained resin were measured as follows.

(1) Number average molecular weight: The average molecular weight was measured by gel permeation chromatography (GPC) using a polystyrene standard sample to be 12000.

(2) Acid value: 0.2 g of a sample was precisely weighed, dissolved in 20 ml of chloroform, and then titrated with 0.01 N potassium hydroxide (solution in ethanol) to be 16.1 mg KOH/g.

To 100 parts of the polyester resin were added 40 parts of butyl cellosolve and 2.7 parts of triethylamine, which were then stirred at 80° C. for 1 hour to dissolve. Subsequently, 193 parts of ion-exchanged water was slowly added to obtain an aqueous dispersion 1 of a polyester containing a polyester resin having a nonvolatile content of 30%. In order to measure an average particle diameter, only ion-exchanged water was put in a dedicated cell and a drop of the dispersion was added and stirred. Then, the resin solid content concentration was adjusted to 0.1% by mass and measurement was performed using a dynamic light scattering particle size analyzer LB-500 (manufactured by Horiba, Ltd.) at 20° C. and found that the average particle diameter was 35 nm.

Production Example 4 Production of Phosphoric
Acid Group-Containing Acrylic Resin In a 1-liter reaction vessel equipped with a stirrer, a thermostat, and a cooling tube, 40 parts by mass of ethoxypropanol was charged, into which 121.7 parts of a monomer solution composed of 4 parts of styrene, 35.96 parts of n-butyl acrylate, 18.45 parts of ethylhexyl methacrylate, 13.92 parts of 2-hydroxyethyl methacrylate, 7.67 parts of methacrylic acid, and 40 parts of a solution obtained by dissolving 20 parts of Phosmer PP (acid phosphooxyhexa (oxypropylene) monomethacrylate manufactured by Uni-Chemical Co., Ltd.) in 20 parts of ethoxypropanol, and 1.7 parts of azobisisobutyronitrile was dropped at 120° C. over 3 hours, followed by continuous stirring for 1 hour. The obtained resin was a phosphoric acid group-containing acrylic resin varnish having an acid value of 105 mg KOH/g, including an acid value of 55 mg KOH/g based on a phosphoric acid group, a hydroxyl value of 60 mg KOH/g, and a number average molecular weight of 6000, and the nonvolatile content was 63%.

Example 1

Production of Coating Film-Forming Resin (i)

A coating film-forming resin (i) was obtained by mixing 160 parts of the acrylic resin emulsion 1 obtained in Production Example 1, 10 parts of 10% by mass dimethylaminoethanol, 33 parts of the water-soluble acrylic resin of Production Example 2 (resin solid content: 30%), 33 parts of the polyester resin of Production Example 3 (resin solid content: 30%), 38 parts of CYMEL 204 (mixed alkylated melamine resin manufactured by Mitsui Cytec Inc., solid content: 80%, water tolerance: 3.6 ml) as a melamine resin, and 10 parts of PRIMEPOL PX-1000 (bifunctional polyether polyol, manufactured by Sanyo Chemical Industries, Ltd.), and uniformly dispersing them.

Production of Coloring Pigment Dispersion (ii)

A coloring pigment dispersion (ii) was obtained by mixing 15 parts of Cyanine Blue (Cyanine Blue G-314, manufactured by Sanyo Color Works, LTD.), which is a coloring pigment (D), 30 parts of Disperbyk 190 (nonvolatile content: 40%), which is a pigment dispersing agent, 54.5 parts of ion-exchanged water, and 0.5 parts of BYK-011, which is an antifoaming agent, by using a stirrer such as a disper, and then dispersing them with a dispersing device packed with 0.05 mm zirconia beads as a medium in a volume packing ratio of 70%. The 90%-volume particle diameter (D90) of the coloring pigment (D) contained in the obtained coloring pigment dispersion (ii) was 98 nm.

The 90%-volume particle diameter (D90) of the coloring pigment (D) was measured by the following procedure.

The sample was infinitely diluted with a borate PH standard solution (PH=9.18/25° C.) and then a volume particle diameter (D90) was measured by dynamic light scattering using UPA-150 (particle size distribution analyzer, manufactured by Microtrac, Inc.).

Production of Water-Based Coating Composition

By mixing 100 parts of the obtained coating film-forming resin (i) and 10.16 parts of the coloring pigment dispersion (ii), a water-based coating composition (composition for haze measurement) was produced in which the amount of the coloring pigment (D) was 4% by mass based on 100 parts by mass of the resin solid content of the coating film-forming resin (i).

Example 2

A water-based coating composition (composition for haze measurement) was prepared in the same manner as in Example 1 except that the amounts of the pigment dispersing agent and the ion-exchanged water were changed to 37.5 parts of Disperbyk 190 and 58.11 parts of ion-exchanged water in the production of the coloring pigment dispersion (ii).

Example 3

A water-based coating composition (composition for haze measurement) was prepared in the same manner as in Example 1 except that the amounts of the pigment dispersing agent and the ion-exchanged water were changed to 45 parts of Disperbyk 190 and 61.72 parts of ion-exchanged water in the production of the coloring pigment dispersion (ii).

Example 4

A water-based coating composition (composition for haze measurement) was prepared in the same manner as in Example 1 except that the amounts of the pigment dispersing agent and the ion-exchanged water were changed to 56.25 parts of Disperbyk 190 and 67.51 parts of ion-exchanged water in the production of the coloring pigment dispersion (ii).

Example 5

A water-based coating composition (composition for haze measurement) was prepared in the same manner as in Example 1 except that the coloring pigment (D) was changed from 15 parts of Cyanine Blue to 15 parts of Perylene Red (PALIOGEN RED L-3875, manufactured by BASF) in the production of the coloring pigment dispersion (ii).

Example 6

A water-based coating composition (composition for haze measurement) was prepared in the same manner as in Example 5 except that the amounts of the pigment dispersing agent and the ion-exchanged water were changed to 37.5 parts of Disperbyk 190 and 58.11 parts of ion-exchanged water in the production of the coloring pigment dispersion (ii).

Example 7

A water-based coating composition (composition for haze measurement) was prepared in the same manner as in Example 5 except that the amounts of the pigment dispersing agent and the ion-exchanged water were changed to 45 parts of Disperbyk 190 and 61.72 parts of ion-exchanged water in the production of the coloring pigment dispersion (ii).

Example 8

A water-based coating composition (composition for haze measurement) was prepared in the same manner as in Example 5 except that the amounts of the pigment dispersing agent and the ion-exchanged water were changed to 56.25 parts of Disperbyk 190 and 67.51 parts of ion-exchanged water in the production of the coloring pigment dispersion (ii).

Example 9

A water-based coating composition (composition for haze measurement) was prepared in the same manner as in Example 1 except that the coloring pigment (D) was changed from 15 parts of Cyanine Blue to 15 parts of Diketopyrrolopyrrole Red (IRGAZIN RUBINE L 4052, manufactured by BASF) in the production of the coloring pigment dispersion (ii).

Example 10

A water-based coating composition (composition for haze measurement) was prepared in the same manner as in Example 9 except that the amounts of the pigment dispersing agent and the ion-exchanged water were changed to 37.5 parts of Disperbyk 190 and 58.11 parts of ion-exchanged water in the production of the coloring pigment dispersion (ii).

Example 11

A water-based coating composition (composition for haze measurement) was prepared in the same manner as in Example 9 except that the amounts of the pigment dispersing agent and the ion-exchanged water were changed to 56.25 parts of Disperbyk 190 and 67.51 parts of ion-exchanged water in the production of the coloring pigment dispersion (ii).

Example 12

A water-based coating composition (composition for haze measurement) was prepared in the same manner as in Example 1 except that the coloring pigment (D) was changed from 15 parts of Cyanine Blue to 15 parts of Iron Oxide Red (IPN-050H, manufactured by TODA KOGYO CORP.) in the production of the coloring pigment dispersion (ii).

Comparative Example 1

A water-based coating composition (composition for haze measurement) was prepared in the same manner as in Example 1 except that the amounts of the pigment dispersing agent and the ion-exchanged water were changed to 22.5 parts of Disperbyk 190 and 50.89 parts of ion-exchanged water in the production of the coloring pigment dispersion (ii).

Comparative Example 2

A water-based coating composition (composition for haze measurement) was prepared in the same manner as in Example 1 except that the amounts of the pigment dispersing agent and the ion-exchanged water were changed to 18.75 parts of Disperbyk 190 and 49.08 parts of ion-exchanged water in the production of the coloring pigment dispersion (ii).

Comparative Example 3

A water-based coating composition (composition for haze measurement) was prepared in the same manner as in Comparative Example 1 except that the coloring pigment (D) was changed from 15 parts of Cyanine Blue to 15 parts of Perylene Red (PALIOGEN RED L-3875, manufactured by BASF) in the production of the coloring pigment dispersion (ii).

Comparative Example 4

A water-based coating composition (composition for haze measurement) was prepared in the same manner as in Comparative Example 2 except that 15 parts of Cyanine Blue was changed to 15 parts of Perylene Red (PALIOGEN RED L-3875, manufactured by BASF) in the production of the coloring pigment dispersion (ii).

Comparative Example 5

A water-based coating composition (composition for haze measurement) was prepared in the same manner as in Example 2 except that a coating film-forming resin was prepared using 160 parts of the acrylic resin emulsion 2 instead of 160 parts of the acrylic resin emulsion 1 in the production of the coating film-forming resin (i).

Comparative Example 6

A water-based coating composition (composition for haze measurement) was prepared in the same manner as in Example 6 except that a coating film-forming resin was prepared using 160 parts of the acrylic resin emulsion 2 instead of 160 parts of the acrylic resin emulsion 1 in the production of the coating film-forming resin (i).

Comparative Example 7

A water-based coating composition (composition for haze measurement) was prepared in the same manner as in Example 2 except that a coating film-forming resin was prepared using 160 parts of the acrylic resin emulsion 3 instead of 160 parts of the acrylic resin emulsion 1 in the production of the coating film-forming resin (i).

Comparative Example 8

A water-based coating composition (composition for haze measurement) was prepared in the same manner as in Example 6 except that a coating film-forming resin was prepared using 160 parts of the acrylic resin emulsion 3 instead of 160 parts of the acrylic resin emulsion 1 in the production of the coating film-forming resin (i).

The following evaluations were carried out using the water-based coating compositions (compositions for haze measurement) obtained in the above Examples and Comparative Examples. The results of the evaluations are shown in the following table.

Haze Value Measurement of Cured Coating Film of Composition for Haze Measurement A composition for haze measurement was applied onto a glass sheet or a PET film using a 6 mil applicator and then cured to form a cured coating film having a thickness of 25 μm.

The total light transmittance (Tt) and the scattered light transmittance (Td) of the obtained cured coating film were measured using NDH-2000 (a haze meter manufactured by Nippon Denshoku Industries Co., Ltd.). A haze value was calculated using the following equation.

$$\text{Haze value (Th)} = \text{scattered light transmittance (Td)} / \text{total light transmittance (Tt)} \times 100$$

Evaluation of Transparency of Coating Film

A cured coating film of a composition for haze measurement resulting from the above was visually evaluated by the following criteria.

○: There is no turbidity.

Δ: There is slight turbidity.

x: There is turbidity.

Measurement of Shade Brightness (the First Base Coating Film is Black.)

Formation of Multilayer Coating Film

To a coated sheet prepared by applying electrodeposition coating with a cation electrodeposition coating "Power Top U-50" produced by Nippon Paint Co., Ltd. to a dull steel sheet treated with zinc phosphate and having a thickness of 0.8 mm, a length of 30 cm, and a width of 40 cm such that a dry thickness would be 20 μm, followed by baking at 160° C. for 30 minutes, a gray intermediate coating "Olga OP-30" (polyester melamine-based coating, produced by Nippon Paint Co., Ltd.), which had been diluted to 25 seconds (measured at 20° C. using a No. 4 Ford cup), was applied in two stages with an air spray such that the dry thickness would be 35 μm, followed by baking at 140° C. for 30 minutes.

After cooling, a water-based base coating composition (AQUAREX AR-3000 (black) (trade name), a water-based coating composition containing a black pigment as a coloring pigment, manufactured by Nippon Paint Automotive Coatings Co., Ltd.) was diluted with deionized exchanged water to 6000 mPas (measured at 6 rpm at 20° C. using a B-type viscometer). The resultant was applied in two stages with a "Cartridge Bell" at a room temperature of 23° C. and a humidity of 68% such that the dry thickness would be 15 μm. An interval setting of 1 minute 30 seconds was performed between the two applications. After the second application, setting was performed at an interval of 1 minute and 30 seconds. Thereafter, preheating was performed at 80° C. for 5 minutes to form an uncured first base coating film.

Onto the resulting uncured first base coating film, the water-based coating compositions obtained in Examples and Comparative Examples were applied in two stages with a "Cartridge Bell" at a room temperature of 23° C. and a humidity of 68% such that the dry thickness would be 15 μm. An interval setting of 1 minute 30 seconds was performed between the two applications. After the second application, setting was performed at an interval of 1 minute and 30 seconds. Thereafter, preheating was performed at 80° C. for 5 minutes to form an uncured second base coating film.

Subsequently, the resulting coated sheet was allowed to cool to room temperature, and then MACFLOW 0-1820 (a solvent type clear coating composition, produced by Nippon Paint Co., Ltd.) was applied as a clear coating composition in one stage such that the dry thickness would be 35 μm, followed by setting for 7 minutes. Subsequently, the coated sheet was baked at 140° C. for 30 minutes in a dryer to obtain a multilayer coating film.

Measurement of Shade Brightness

A resulting multilayer coating film was irradiated with a light source at an angle of 45 degrees from the vertical position, and an L* value received at an angle of 110° from that position was measured using a multi-angle spectrophotometer "MA-68 II" manufactured by X-Rite. By calculating the average value of the measured values thus obtained, a brightness (L*) at a light receiving angle of 110 degrees was determined. It is shown as "L110" in the following table. The position of the light receiving angle of 110 degrees corresponds to the shade position.

The above L* is a parameter in the L*C*h color system, and can be determined in accordance with JIS Z8729. The L*C* h color system is a color system defined by the Commission Internationale de l'Eclairage and described in Section 4.2 of CIE Publication 15.2 (1986). In the L*C* h color system, L* represents brightness, C* represents chroma, and h represents hue angle. The brightness L* means that the whiteness of a substance to be measured increases as the numerical value increases, and the blackness increases as the numerical value decreases.

28

Measurement of Flip-Flop (FF) Property (the First Base Coating Film is a Silver Coating Film.)
Formation of Multilayer Coating Film To a coated sheet prepared by applying electrodeposition coating with a cation electrodeposition coating "Power Top U-50" produced by Nippon Paint Co., Ltd. to a dull steel sheet treated with zinc phosphate and having a thickness of 0.8 mm, a length of 30 cm, and a width of 40 cm such that a dry thickness would be 20 μm, followed by baking at 160° C. for 30 minutes, a gray intermediate coating "Olga OP-30" (polyester melamine-based coating, produced by Nippon Paint Co., Ltd.), which had been diluted to 25 seconds (measured at 20° C. using a No. 4 Ford cup), was applied in two stages with an air spray such that the dry thickness would be 35 μm, followed by baking at 140° C. for 30 minutes.

After cooling, a water-based metallic base coating composition (AQUAREX AR-3000 (silver) (trade name), a water-based coating composition containing a luster pigment as a coloring pigment, manufactured by Nippon Paint Automotive Coatings Co., Ltd.) was diluted with deionized exchanged water to 6000 mPa·s (measured at 6 rpm at 20° C. using a B-type viscometer). The resultant was applied in two stages with a "Cartridge Bell" at a room temperature of 23° C. and a humidity of 68% such that the dry thickness would be 15 μm. An interval setting of 1 minute 30 seconds was performed between the two applications. After the second application, setting was performed at an interval of 1 minute and 30 seconds. Thereafter, preheating was performed at 80° C. for 5 minutes to form an uncured first base coating film.

Onto the resulting uncured first base coating film, the water-based coating compositions obtained in Examples and Comparative Examples were applied in two stages with a "Cartridge Bell" at a room temperature of 23° C. and a humidity of 68% such that the dry thickness would be 15 μm. An interval setting of 1 minute 30 seconds was performed between the two applications. After the second application, setting was performed at an interval of 1 minute and 30 seconds. Thereafter, preheating was performed at 80° C. for 5 minutes to form an uncured second base coating film.

Subsequently, the resulting coated sheet was allowed to cool to room temperature, and then MACFLOW 0-1820 (a solvent type clear coating composition, produced by Nippon Paint Co., Ltd.) was applied as a clear coating composition in one stage such that the dry thickness would be 35 μm, followed by setting for 7 minutes. Subsequently, the coated sheet was baked at 140° C. for 30 minutes in a dryer to obtain a multilayer coating film.
Flip-Flop (FF) Property A resulting multilayer coating film was irradiated with a light source at an angle of 45 degrees from the vertical position, and an L* value received at an angle of 25 degrees from the light source irradiation position (L25) was measured in the same manner as described above. Similarly, an L* value received at an angle of 75 degrees from the light source irradiation position (L75) was measured.

L25/L75 was calculated using the obtained measured values, and the flip-flop property was evaluated. The higher the value (L25/L75), the stronger the flip-flop property.

TABLE 1

|  |  | Examples | | | | | | | | | |
|  |  | 1 | 2 | 3 | 4 | 5 | 6 | 7 | 8 | 9 | 10 |
| Coloring pigment | Cyanine Blue | ○ | ○ | ○ | ○ |  |  |  |  |  |  |
| (D) | Perylene Red |  |  |  |  | ○ | ○ | ○ | ○ |  |  |
|  | DPP Red |  |  |  |  |  |  |  |  | ○ | ○ |
|  | Iron oxide red |  |  |  |  |  |  |  |  |  |  |

TABLE 1-continued

| | | | | | | | | | | | |
|---|---|---|---|---|---|---|---|---|---|---|---|
| Coloring pigment dispersion (ii) | D90 (nm) | 98 | 52 | 28 | 7 | 95 | 48 | 32 | 7 | 96 | 51 |
| Acrylic resin emulsion (A) | Average particle diameter (nm) | 88 | 88 | 88 | 88 | 88 | 88 | 88 | 88 | 88 | 88 |
| Haze value of composition for haze measurement | | 3.6 | 3.4 | 3.4 | 3.4 | 7.4 | 7.1 | 7.0 | 6.9 | 5.8 | 3.8 |
| Transparency of coating film (visual evaluation) | | ○ | ○ | ○ | ○ | ○ | ○ | ○ | ○ | ○ | ○ |
| Shade brightness (black back) | L110 | 2.3 | 2.1 | 2.1 | 2.1 | 5.0 | 3.9 | 3.9 | 3.9 | 7.8 | 7.4 |
| FF property (silver back) | L25/L75 | 5.2 | 5.2 | 5.2 | 5.3 | 4.0 | 4.3 | 4.4 | 4.4 | 3.5 | 3.7 |

| | | Examples | | Comparative Examples | | | | | | | |
|---|---|---|---|---|---|---|---|---|---|---|---|
| | | 11 | 12 | 1 | 2 | 3 | 4 | 5 | 6 | 7 | 8 |
| Coloring pigment (D) | Cyanine Blue | | | ○ | ○ | | | ○ | | ○ | |
| | Perylene Red | | | | | ○ | ○ | | ○ | | ○ |
| | DPP Red | ○ | | | | | | | | | |
| | Iron oxide red | | ○ | | | | | | | | |
| Coloring pigment dispersion (ii) | D90 (nm) | 8 | 98 | 152 | 255 | 144 | 238 | 52 | 48 | 52 | 48 |
| Acrylic resin emulsion (A) | Average particle diameter (nm) | 88 | 88 | 88 | 88 | 88 | 88 | 312 | 312 | 138 | 138 |
| Haze value of composition for haze measurement | | 3.7 | 7.2 | 9.8 | 11.9 | 10.7 | 12.2 | 13.4 | 18.3 | 8.3 | 10.0 |
| Transparency of coating film (visual evaluation) | | ○ | ○ | x | x | x | x | x | x | Δ | Δ |
| Shade brightness (black back) | L110 | 7.3 | 3.5 | 6.2 | 12.3 | 11.1 | 13.3 | 15.9 | 21.2 | 6.0 | 9.2 |
| FF property (silver back) | L25/L75 | 3.7 | 3.4 | 3.9 | 3.3 | 1.9 | 1.9 | 3.3 | 1.9 | 4.9 | 3.2 |

The compositions for haze measurement obtained in the above Examples all had a haze value of 8 or less and were confirmed to be high in transparency. Also the coating films obtained were high in transparency. Furthermore, they were low in shade brightness and were confirmed to be high in FF property.

All of Comparative Examples 1 to 4 are examples in which the 90%-volume particle diameter (D90) of the coloring pigment (D) contained in a coloring pigment dispersion (ii) exceeds 100 nm. In all of these cases, it was confirmed that the haze value of the composition was high and the turbidity of the composition was high. Moreover, it was confirmed that also the coating films obtained were low in transparency. Furthermore, they were high in shade brightness and were confirmed to be low in FF property.

All of Comparative Examples 5 to 8 are examples in which the average particle diameter (D50) of the acrylic resin emulsion contained in a coating film-forming resin (i) exceeds 100 nm. In all of these cases, it was confirmed that the haze value of the composition was high and the turbidity of the composition was high. Moreover, it was confirmed that also the coating films obtained were low in transparency. Furthermore, they were high in shade brightness and were confirmed to be low in FF property.

Figure 2:
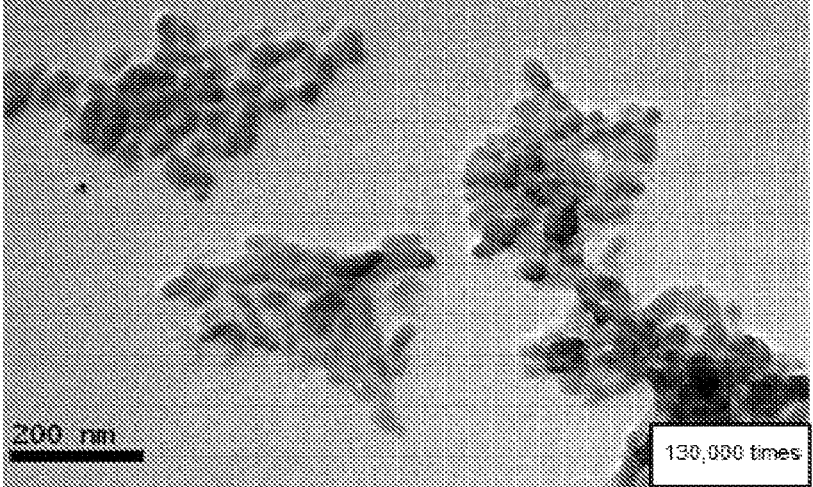
FIG. 2 is a transmission electron micrograph of the coloring pigment dispersion (ii) prepared in Comparative Example 4.

FIG. 1 is a transmission electron micrograph of the coloring pigment dispersion (ii) prepared in Example 6. In addition, FIG. 2 is a transmission electron micrograph of the coloring pigment dispersion (ii) prepared in Comparative Example 4. These transmission electron micrographs were observed and taken using a transmission electron micro-scope TEM JEM-2000 (manufactured by JEOL Ltd.) after diluting a coloring pigment dispersion (ii) to about 300 times with ultrapure water, followed by dropping 2 or 3 drops of the dilution onto a copper mesh with a support film, followed by drying at normal temperature.

As shown in FIG. 1, in the coloring pigment dispersion (ii) prepared in Example 6, almost no coloring pigment aggregation occurred. On the other hand, as shown in FIG. 2, it can be seen that in the coloring pigment dispersion (ii) prepared in Comparative Example 4, there were aggregates of the coloring pigment. It is conceivable that due to this pigment aggregation, the 90%-volume particle diameter (D90) of the coloring pigment (D) contained in a coloring pigment dispersion (ii) exceeds 100 nm, so that the haze value of a water-based coating composition was increased as described above and the transparency of a coating film was also lowered.

INDUSTRIAL APPLICABILITY

By using the water-based coating composition of the present invention, it is possible to form a highly designed multilayer coating film being high in chroma and brightness and having a deep feeling of color. The water-based coating composition of the present invention can be suitably used in the case of forming a highly designed coating film on an automotive exterior panel or the like.

The invention claimed is:

1. A method for producing a water-based coating composition, comprising a step of mixing and dispersing a coloring pigment (D) and a comb-structured non-ionic pigment dispersing agent in an aqueous medium using a dispersion medium to produce a coloring pigment dispersion (ii), wherein an amount of the comb-structured non-ionic pigment dispersing agent is 65 to 150 parts by mass as solid content mass parts based on 100 parts by mass of the coloring pigment (D), the dispersion medium has a particle diameter of 0.03 mm to 0.05 mm, and a material of the dispersion medium is zirconia; and a step of mixing a coating film-forming resin (i) and the coloring pigment dispersion (ii) to produce the water-based coating composition, wherein the coating film-forming resin (i) comprises an acrylic resin emulsion (A) having an average particle diameter of 100 nm or less in an amount of 10 to 60% by mass in terms of a resin solid content of the coating film-forming resin (i), a water-soluble acrylic resin (B) in an amount of 5 to 40% by mass in terms of the resin solid content of the coating film-forming resin (i), and a melamine resin (C) in an amount of 20 to 40% by mass in terms of the resin solid content of the coating film-forming resin (i).

2. The method for producing a water-based coating composition, according to claim 1, wherein the coloring pigment (D) included in the coloring pigment dispersion (ii) has a 90%-volume particle diameter (D90) of 100 nm or less.

3. The method for producing a water-based coating composition, according to claim 1, wherein the coloring pigment (D) is one or more coloring pigments selected from the group consisting of an organic coloring pigment and an inorganic coloring pigment, the organic coloring pigment is one or more selected from the group consisting of azo-chelate-based pigments, insoluble azo-based pigments, condensed azo-based pigments, diketopyrrolopyrrole-based pigments, phthalocyanine-based pigments, indigo pigments, perinone-based pigments, perylene-based pigments, dioxane-based pigments, quinacridone-based pigments, isoindolinone-based pigments, and metal complex pigments, and the inorganic coloring pigment is one or more selected from the group consisting of chrome yellow, yellow iron oxide, colcothar, carbon black, and titanium dioxide.

* * * * *